(12) United States Patent
Van Druten et al.

(10) Patent No.: US 8,801,558 B2
(45) Date of Patent: *Aug. 12, 2014

(54) TRANSMISSION MODULE FOR A HYBRID DRIVE

(71) Applicant: DTI Group, B.V., Eindhoven (NL)

(72) Inventors: Roell Marie Van Druten, Eindhoven (NL); Alexander Franciscus Anita Serrarens, Waalre (NL); Bas Gerard Vroemen, Eindhoven (NL)

(73) Assignee: DTI Group B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,146

(22) Filed: Jun. 3, 2013

(65) Prior Publication Data

US 2013/0260938 A1    Oct. 3, 2013

Related U.S. Application Data

(63) Continuation of application No. PCT/NL2011/050833, filed on Dec. 5, 2011.

(30) Foreign Application Priority Data

Dec. 3, 2010   (NL) .................................... 2005815

(51) Int. Cl.
   *F16H 3/72*   (2006.01)
(52) U.S. Cl.
   USPC ........................................................... 475/5

(58) Field of Classification Search
   USPC ............................................................ 475/5
   See application file for complete search history.

(56) References Cited

U.S. PATENT DOCUMENTS

| 6,558,289 B2 * | 5/2003 | Chung ............................. 477/3 |
| 7,597,648 B2 * | 10/2009 | Conlon et al. ................... 477/4 |
| 8,000,865 B2 * | 8/2011 | Conlon et al. ................... 701/51 |
| 8,083,626 B2 * | 12/2011 | Conlon et al. ................... 475/5 |
| 8,241,166 B2 * | 8/2012 | Sung ............................. 475/280 |
| 8,317,648 B2 * | 11/2012 | Robinette et al. ............ 475/317 |
| 8,425,359 B1 * | 4/2013 | Holmes et al. .................... 475/5 |
| 8,512,189 B2 * | 8/2013 | Holmes et al. .................... 475/5 |
| 2010/0203995 A1 * | 8/2010 | Zhang et al. ....................... 475/5 |
| 2013/0109525 A1 * | 5/2013 | Van Druten et al. ............. 475/5 |

FOREIGN PATENT DOCUMENTS

| EP | 2182250 | 5/2010 |
| EP | 2249063 | 11/2010 |
| WO | WO 2010/065017 | 3/2012 |

* cited by examiner

*Primary Examiner* — Dirk Wright
(74) *Attorney, Agent, or Firm* — Eric Karich

(57) ABSTRACT

A drive mechanism has a transmission module which has a first input which is connected to an electromotor/generator, and a second input which is connected to a combustion engine. The transmission module has a planetary gear set having three rotational members of which a first rotational member is connected to the input, a second rotational member is connected to an output, and a third rotational member is connected to a brake. A clutch is positioned between the combustion engine and the third rotational member and a further clutch is positioned between the combustion engine and the first rotational member.

5 Claims, 1 Drawing Sheet

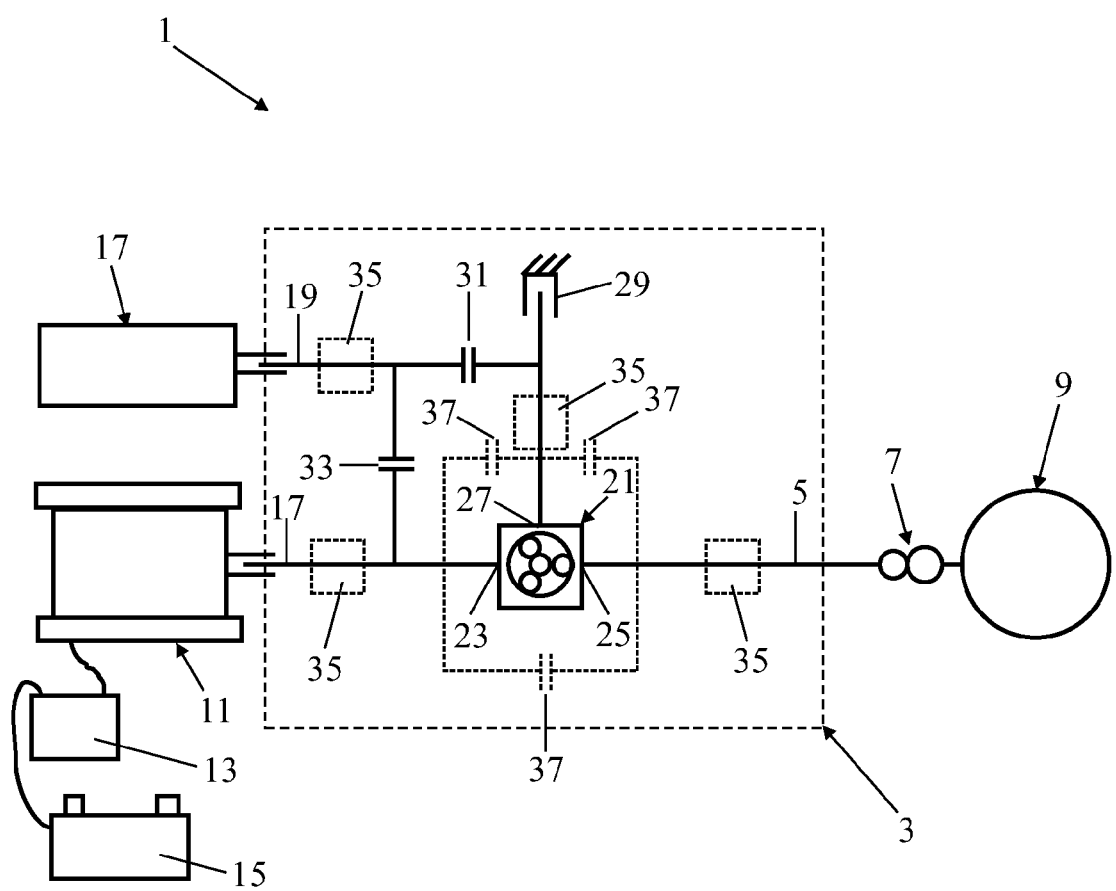

TRANSMISSION MODULE FOR A HYBRID DRIVE

CROSS-REFERENCE TO RELATED APPLICATIONS

This application for a utility patent is a continuation of a previously filed patent application, now abandoned, having the application number PCT/NL2011/050833, filed Dec. 5, 2011. This application also claims the benefit of NL 2005815, filed Dec. 3, 2010.

DESCRIPTION

1. Field of the Invention

The invention relates to a transmission module for a vehicle, and more particularly a transmission module for a hybrid drive mechanism having a first input which can be connected to an electromotor/generator, and an output which can be connected to a load.

2. State of the Art

A transmission module of this general type is disclosed in WO 2010/063735 A. For a hybrid drive mechanism it is desired for a transmission module to provide a limited number (preferably two or three) of transmission ratios between the drive sources and the load so as to have the drive sources operate in an operational area and achieve a more advantageous fuel consumption.

SUMMARY OF THE INVENTION

The invention is a transmission module for a hybrid drive mechanism having a first input which can be connected to an electromotor/generator, and an output which can be connected to a load, the transmission module comprising a brake as well as an epicyclic gearing comprising at least three rotational members, a first rotational member of which being connected to the first input, a second rotational member being connected to the output and the third rotational member being connected to the brake.

It is an object of the invention to provide a transmission module of the type defined in the opening paragraph in which a limited number of switchable transmissions is realized in a simple and advantageous manner. For this purpose the transmission module according to the invention is characterized in that the transmission module further has a second input which can be connected to a combustion engine and which is or can be connected to the third rotational member. This is to be understood as follows: the second input is not or cannot be coupled to the third rotational member via the first or second rotational member, but is connected directly or optionally via one or more intermediate elements to the third rotational member (where no intermediate element is present or the intermediate element(s) cannot interrupt the connection) or can be connected indeed to the third rotational member (in the case where there is an intermediate element present though which can interrupt the connection). The intermediate element may be understood to mean, for example, a switchable transmission, fixed or variable speed transforming gear, clutch or declutch. In this combination the combustion engine may not only drive the load, but by varying the r.p.m. of the combustion engine also the gear ratio between the first input and output may be varied.

The transmission module preferably comprises a clutch which is positioned between the second input and the third rotational member.

An embodiment of the transmission module according to the invention is characterized in that the second input can further be connected to the first rotational member. This provides additional functionality in that the battery can be charged by the combustion engine via the electromotor/generator without the load being driven.

The transmission module further preferably includes a further clutch which is positioned between the second input and the first rotational member.

A further embodiment of the transmission module according to the invention is characterized in that the transmission module comprises a short-circuit clutch which is positioned between two of the three rotational members.

A still further embodiment of the transmission module according to the invention is characterized in that the transmission module comprises a fixed and/or variable speed transforming gear and/or a switchable transmission which is positioned between one of the rotational members and the first or second input, brake or output connected to that member.

The invention likewise relates to a drive mechanism for a vehicle, which drive mechanism comprises an electromotor/generator, as well as a combustion engine, and a transmission module according to the invention, where the output of the transmission module can be connected to wheels of the vehicle, the first input of the transmission module is connected to the electromotor/generator and the second input of the transmission module is connected to the combustion engine.

BRIEF DESCRIPTION OF THE DRAWINGS

The invention will be described below in more detail based on an example of embodiment of the drive mechanism including a transmission module according to the invention represented in the drawing FIGURE, in which:

FIG. 1 gives a diagrammatic representation of an embodiment of the drive mechanism including a transmission module according to the invention.

DETAILED DESCRIPTION OF THE DRAWING

FIG. 1 gives a diagrammatic representation of an embodiment of the drive mechanism 1 including a transmission module 3 according to the invention. The drive mechanism 1 is present in a vehicle where an output 5 of the transmission module is connected via an end drive 7 to a differential 9 of the vehicle. The differential is connected via drive shafts to the driven wheels of the vehicle.

In addition to the transmission module the drive mechanism includes an electromotor/generator 11 which is connected via power electronics 13 to a battery 15, and also includes a combustion engine 17. The transmission module 3 further has a first input 17 which is connected to the electromotor/generator 11, and a second input 19 which is connected to the combustion engine 17.

The transmission module 3 includes a planetary gear set 21 having three rotational members, a first rotational member 23 of which being connected to the input 17, a second rotational member 25 being connected to the output 5, and the third rotational member 27 being connected to a brake 29.

Between the combustion engine 17 and the third rotational member 27 is positioned a clutch 31 and between the combustion engine 17 and the first rotational member 23 is positioned a further clutch 33.

Between the first rotational member and the first input and/or between the second rotational member and the output and/or between the third rotational member and the second input and/or the brake may optionally be positioned a fixed or variable speed transforming gear or a switchable transmission 35. This is indicated by means of a dotted line.

Furthermore, a short-circuit clutch 37 may be present between two of the three rotational members. This is also indicated by means of a dotted line.

Albeit the invention has been described in the foregoing based on the drawing, it should be observed that the invention is not by any manner or means restricted to the embodiment shown in the drawing. The invention also extends to all embodiments deviating from the embodiment shown in the drawing within the spirit and scope defined by the claims.

What is claimed is:

1. A transmission module for a hybrid drive mechanism having a first input which can be connected to an electromotor/generator, and an output which can be connected to a load, the transmission module comprising:
    a brake;
    an epicyclic gearing comprising at least three rotational members, a first rotational member adapted to be connected to the first input, a second rotational member adapted to be connected to the output, and a third rotational member being connected to the brake;
    a second input adapted to be connected to a combustion engine and which is or can be connected to the third rotational member;
    a clutch which is positioned between the second input and the third rotational member; and
    a further clutch which is positioned between the second input and the first rotational member.

2. The transmission module of claim 1, further comprising a short-circuit clutch which is positioned between two of the three rotational members.

3. The transmission module of claim 1, further comprising a fixed and/or variable speed transforming gear and/or a switchable transmission which is positioned between one of the rotational members and the first or second input, brake or output connected to that member.

4. A drive mechanism for a vehicle having wheels, the drive mechanism comprising:
    an electromotor/generator;
    a combustion engine;
    a hybrid drive mechanism having a first input which is connected to the electromotor/generator, and an output which is connected to the wheels of the vehicle; and
    a transmission module comprising:
        a brake;
        an epicyclic gearing comprising at least three rotational members, a first rotational member connected to the first input, a second rotational member connected to the output, and a third rotational member being connected to the brake;
        a second input adapted to be connected to a combustion engine and which is or can be connected to the third rotational member;
        a clutch which is positioned between the second input and the third rotational member; and
        a further clutch which is positioned between the second input and the first rotational member.

5. A transmission module used in conjunction with an electromotor/generator and a load, the transmission module comprising:
    a hybrid drive mechanism having a first input which can be connected to the electromotor/generator, and an output which can be connected to the load;
    a brake;
    an epicyclic gearing comprising at least three rotational members, a first rotational member adapted to be connected to the first input, a second rotational member adapted to be connected to the output, and a third rotational member being connected to the brake;
    a second input adapted to be connected to a combustion engine and which is or can be connected to the third rotational member;
    a clutch which is positioned between the second input and the third rotational member; and
    a further clutch which is positioned between the second input and the first rotational member.

* * * * *